May 29, 1923.

A. G. WRIGHT

DENTAL AMALGAM MACHINE

Filed Oct. 21, 1922

WITNESS:

INVENTOR

Alfred G. Wright.

BY Augustus B. Stoughton

ATTORNEY.

May 29, 1923.
A. G. WRIGHT
1,456,526
DENTAL AMALGAM MACHINE
Filed Oct. 21, 1922
5 Sheets-Sheet 3
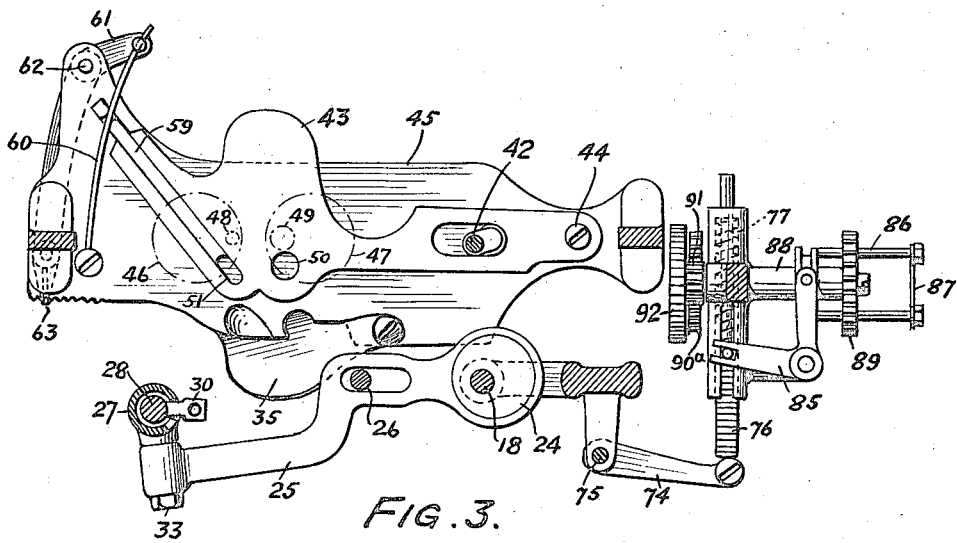
FIG. 3.
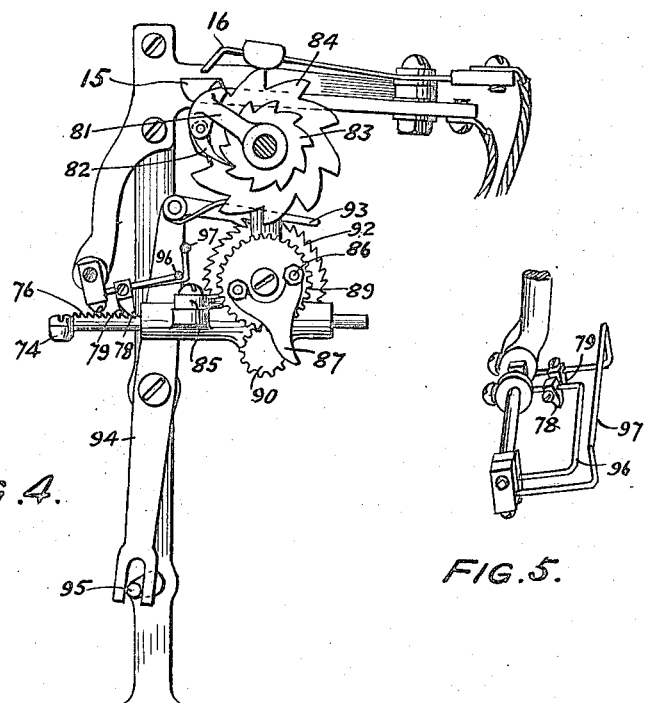
FIG. 4.
FIG. 5.
WITNESS:
INVENTOR
Alfred G. Wright.
BY
Augustus B. Stoughton
ATTORNEY.

May 29, 1923.

A. G. WRIGHT 1,456,526

DENTAL AMALGAM MACHINE

Filed Oct. 21, 1922

WITNESS:

INVENTOR
Alfred G. Wright
BY
Augustus B. Stoughton
ATTORNEY.

May 29, 1923.

A. G. WRIGHT 1,456,526

DENTAL AMALGAM MACHINE

Filed Oct. 21, 1922

INVENTOR
Alfred G. Wright
BY
Augustus B. Stoughton
ATTORNEY.

WITNESS:

Patented May 29, 1923.

1,456,526

UNITED STATES PATENT OFFICE.

ALFRED G. WRIGHT, OF BYWOOD, PENNSYLVANIA.

DENTAL-AMALGAM MACHINE.

Application filed October 21, 1922. Serial No. 596,002.

*To all whom it may concern:*

Be it known that I, ALFRED G. WRIGHT, a citizen of the United States, residing at Bywood, in the county of Delaware and State of Pennsylvania, have invented a new and useful Improvement in Dental-Amalgam Machines, of which the following is a specification.

The principal objects of the present invention are, first, to provide a compact, reliable and fully automatic machine which can be set to mix variable quantities of amalgam such as may be required for cavities of different sizes and then started, whereupon it will automatically measure the appropriate quantities of the ingredients, mix them for the appropriate length of time or to the proper degree of stirring or trituration, and then automatically come to rest ready for a repetition of the described operation; second, to make the machine convenient for the operator and easily managed by him and to guard against the inadvertence of the operator by which he might unintentionally mix the ingredients of the amalgam in loading the machine, and third; to provide a machine which will mix the ingredients and prepare both large and small quantities of amalgam which is always uniform while at the same time the relative proportions of the ingredients can be manually fixed from time to time but until so fixed will always be the same.

Generally stated, a machine of the invention includes mechanism which is manually set as by means of a dial and which determines the number of repetitions of the operation of measuring mechanism and the operation of the mixing or triturating mechanism that will take place when the machine is manually started as by the operation of a controller until the machine is automatically stopped with its parts ready for a repetition of the described functions.

The invention comprises the improvements to be presently described and finally claimed and that description will be made in connection with the embodiment of the invention chosen for illustration in the accompanying drawings forming part hereof and in which Figure 1 is a front view of the machine, partly in section, and with some of the parts omitted for the sake of clearness.

Fig. 3 is a sectional view taken on the line 3—3 of Fig. 1.

Fig. 4 is an elevational view, partly in section, of the right hand end of the machine shown in Fig. 1.

Fig. 5 is a perspective view of one of the parts shown in Fig. 4.

Figure 1:
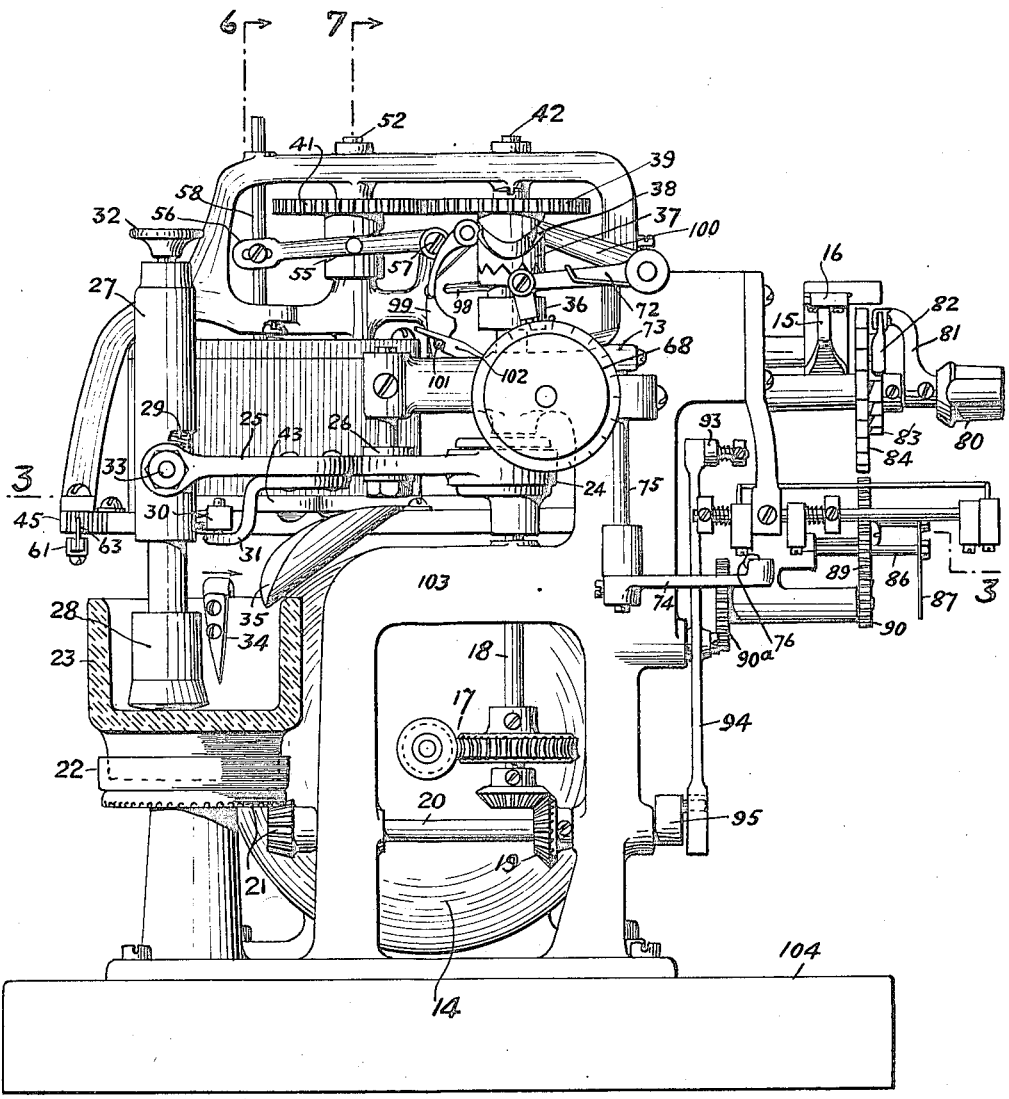
Figure 6:
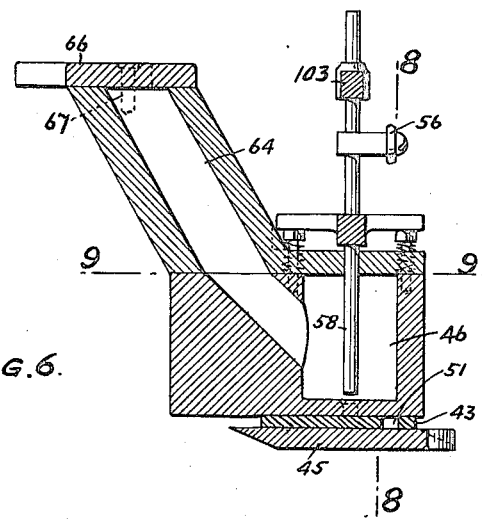
Figure 7:
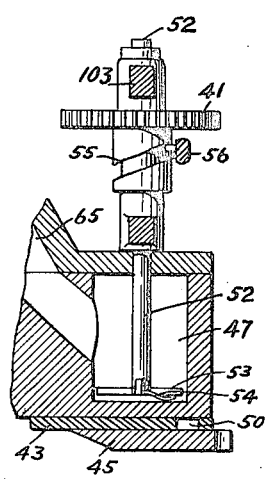

Figs. 6 and 7 are sectional views taken on the lines 6 and 7 in Fig. 1.

Figures 8, 9:
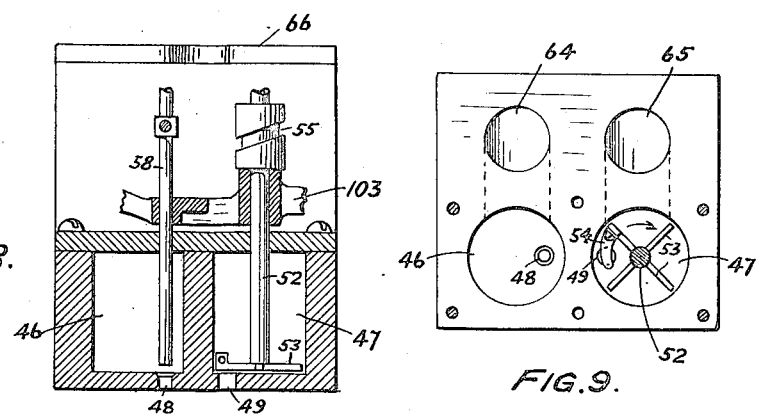

Fig. 8 is a sectional view taken on the line 8—8 of Fig. 6.

Fig. 9 is a sectional view taken on the line 9—9 of Fig. 6.

Figure 2:
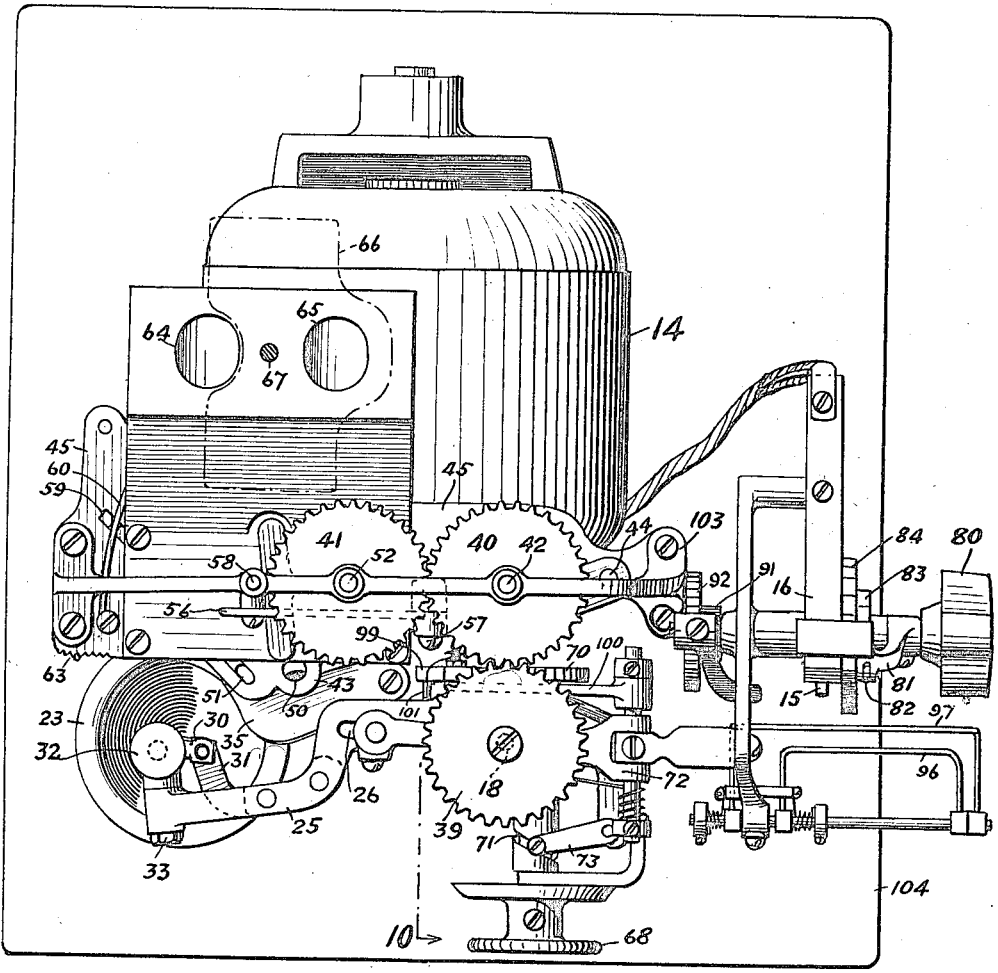
Fig. 2 is a top or plan view of the machine from which some of the elements have been omitted for the sake of clearness.
Figure 10:
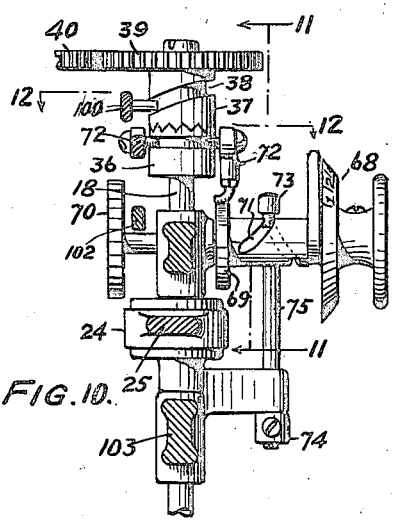

Fig. 10 is a sectional view taken on the line 10 of Fig. 2.

Figure 11:
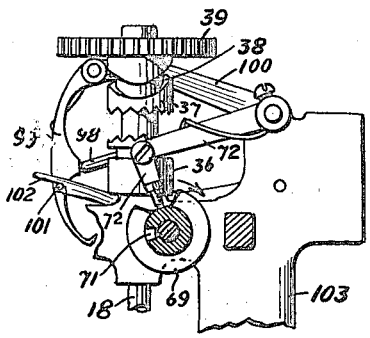

Fig. 11 is a sectional view taken on the line 11—11 of Fig. 10.

Figure 12:
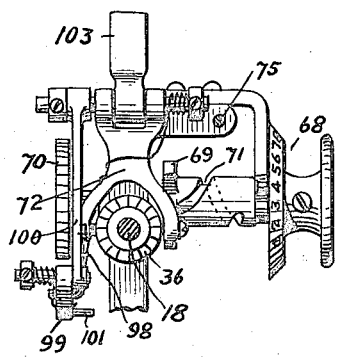

Fig. 12 is a sectional view taken on the line 12—12 of Fig. 10, and

Figure 13:
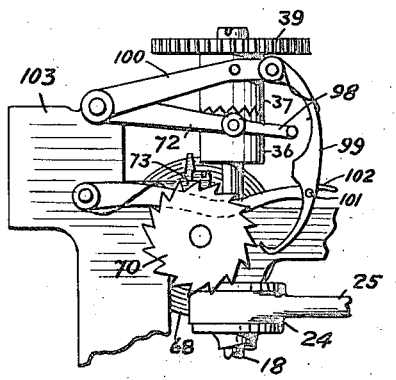

Fig. 13 is a view looking from left to right in Fig. 12.

14 is a power device shown as an electric motor and its circuit is made and broken by the fixed contact 15, and the movable contact 16, Fig. 4, in order to start and stop it. Through the worm gear 17, Fig. 1, the motor drives the upright shaft 18, and through the bevel gear 19 the motor actuates the horizontal shaft 20. As long as the motor is running the shaft 20 by the gearing 21 rotates the holder 22 which carries the mortar 23 that is detachably connected with it, and as long as the motor is running the shaft 18 through the eccentric 24 drives the arm 25 which is supported by a slot-and-pin connection 26, Fig. 3. The end of the arm 25 is provided with a pivotal tubular head 27 in which the stem of the pestle 28 is mounted with a spring 29, Fig. 1, tending to press it against the mortar. Between the head 27 and the stem of the pestle there is a bayonet joint the arm 30 of which is provided with an orifice that detachably engages a pin on a bracket 31 fast on the arm 25, so that the pestle when the pin of the bracket 31 is in the position shown in Fig. 1, in engagement with the arm 30, describes a circular path and works in contact with the mortar. By means of the handle 32 the pestle can be lifted against the spring 29 upward through the head 27, disengaging the pin of the arm 30 from the bracket 31, and then locked in that position so that the head 27 and pestle can be turned about 33 out of the way of the mortar which can be readily removed. 34 is a rider arranged on the rim of the mortar and adapted to be held at rest by a fixed portion of the machine such as the chute 35 in order to operate as a scraper. On the upper end of the shaft 18 there is a clutch member 36, Figs. 1 and 10, and it is driven by the shaft 18 but is slidable endwise on the shaft 18. This clutch member 36 may be made to engage and disengage another clutch member 37 loose for rotation on the shaft 18 as will be described. The clutch member 37 is provided with a circumferential cam groove 38 and with a gear wheel 39. The gear wheel 39 meshes with a gear wheel 40 which in turn meshes with a gear wheel 41. The gear wheel 40 drives a crank shaft 42, Fig. 3, which swings a plate 43 about the pivot 44. Plate 43 works on a table 45 at the edge of which is the chute 35, and the plate 43 works under a pair of hoppers 46 and 47, Fig. 8, of which the hopper 46 receives mercury and the hopper 47 receives the powder. The hopper 46 is provided at its bottom with an outlet opening 48, and the hopper 47 is provided at its bottom with an outlet 49. These outlets are usually closed by the plate 43 but the plate 43 has an opening 50 that may be aligned with the opening 49 and an opening 51 that may be aligned with the opening 48. The openings 50 and 51 receive material from the openings 49 and 48, and when the plate moves the contents of the openings 50 and 51 is spilled into the chute 35 from which it drops into the mortar 23. The openings 50 and 51 are proportioned to hold the proper quantities of the ingredients that should be mixed together and the quantity of the material mixed will depend upon the number of times the plate 43 is swung. To facilitate the delivery of the powder a shaft 52 driven by the gear wheel 41 operates stirring arms 53 of which one is provided with a spring trailer 54, and to facilitate delivery of the mercury a cam 55 on the shaft 52 operates an arm 56 pivoted at one end 57, Fig. 1, and having at the other end a plunger 58 which pushes mercury through the opening 48. A slide 59, Fig. 3, in the plate 43, has one of its ends arranged to form a part of the wall of the opening 51, and the spring bar 60 passes through an opening in the slide 59, so that as the plate 43 swings, the bar 60 causes the slide 59 to move endwise enlarging the opening 51 and insuring delivery of the mercury. The lever 61 pivoted at 62 and set by a hand adjustment 63, Figs. 2 and 3, determines the position of the slide 59 and the area of the opening 51. The adjustment 63 affords means for changing the quantity of mercury delivered and the quantity of powder delivered remains the same so that the proportion of powder and mercury can be varied and determined by the adjustment 63. There are a pair of inlets 64 and 65 for the hoppers, and the cover plate 66, Fig. 2, in dash and dot lines, is pivoted at 67 and so shaped, that is, with a notch on one side and a bulge on the other, that when one of the inlets 64 or 65 is open, the other is closed, thus in charging the machine there is no danger of spilling one ingredient into the opening intended for the other ingredient.

From the foregoing description it is evident that as long as the motor is running and the clutch elements 36 and 37 are in engagement, amalgam is being measured, mixed and appropriately triturated. The graduated handle 68 affords means for controlling the disengagement of the clutch members 36 and 37 and for controlling the ultimate stoppage of the motor. This handle 68 is turnable and it is provided with a cam 69, a ratchet wheel 70, and a spiral groove 71. The cam 69 operating on one of the branches of a pivotal shipper 72, lifts the clutch member 36 into engagement with the clutch member 37. The spiral groove 71, acting on one arm 73 of a bell-crank, turns and determines the position of the other arm 74, Fig. 3, of the bell-crank which may be said to consist of the arms 73 and 74, and the shaft 75, Fig. 1. There is a rack bar 76 pushed forward by a spring 77 and positioned backward by the arm 74. There are a pair of detents 78 and 79, Figs. 4 and 5, arranged to operate one tooth and a half apart on the teeth of the rack 76, so that when the arm 74 pushes the rack inward, one or the other of the detents holds it, and when the detents are successively operated, they release the rack with a step by step motion. The motor contacts 15 and 16 are closed and the motor is started by turning the handle 80 which operates the arm 81 and pawl 82, Fig. 4, and so turns the connected toothed wheels 83 and 84, Fig. 4, of which the teeth of the wheel 84 release the spring contact 16. The motor having been started and the clutch 36, 37 engaged, the machine operates by power to feed the ingredients of the amalgam and to mix them. The rack 76 is connected by a bell-crank 85 with a revolving frame 86 that carries a tongue 87 and is slidable endwise in respect to the shaft 88. The frame is revolved by a gear wheel 89, Fig. 3, driven by a gear 90, Fig. 4, on a countershaft provided with a gear 90ª, Fig. 1, driven by another gear 91 Fig. 3, directly above it and fast on the ratchet wheel 92. The ratchet wheel 92 is driven by a pawl 93 on a rocking lever 94, Figs. 1 and 4, driven by a crank 95, from the shaft 20. The frame 86 is rotated with an intermittent motion and the tongue 87 successively collides with the swinging bars 96 and 97, that carry the pawls 78 and 79, at each revolution, so that the rack 76 is permitted to move gradually forward under the influence of its spring and thus the tongue 87 moves toward the left until finally it comes into the plane of the wheel 84, which it turns lifting contact 16 and stopping the motor. It may be remarked that after the arm 74 has pushed the rack 76 in, the arm 74 moves out by reason of the retrograde turning of the spiral 71 as will appear from the following description. When the handle 68 is turned its cam 69 lifts clutch member 36 and also an arm 98 projecting from the shipper 72. This clears a pawl 99 actuated by the cam 38 through the lever 100, so that in its stroke the pin 101 can clear the notch in the detent 102 of which the downward movement is limited, so that the pawl 99 is free to turn the ratchet wheel 70 which it does until the shipper 72 rides off of the high part of the cam 69, whereupon the clutch member 36 is disengaged and the parts actuated by the gear wheel 39 brought to rest. In this motion the detent 98 gets into the position shown in Fig. 11, and it and the detent 102 hold the pawl out of action permitting the handle 68 to be again turned. As shown in Fig. 13, when the pawl 99 makes its first downward stroke it will clear the detent 102 which cannot descend and the pin will operate to the left of the notch in the detent.

The machine is shown as mounted in the frame 103 carried by a base 104, so that it is portable.

After the measuring mechanism has been stopped by the disengagement of the clutch members 36 and 37, the mixing mechanism may run for a while because it is driven directly from the shaft 18 which runs until the motor stops, or otherwise stated, the measuring mechanism may be automatically stopped in advance of the stoppage of the mixing mechanism and of the motor.

In use the dentist sets the graduated handle 16 to the position which indicates the amount of filling employed. He then turns the handle 80 which starts the machine. The machine runs measuring ingredients of the amalgam into the mortar 23 and mixing or triturating them for the proper length of time, whereupon the machine automatically stops with the parts ready for a subsequent operation and the amalgam in the mortar is ready for use.

It will be obvious to those skilled in the art to which the invention relates that modifications may be made in details of construction and arrangement without departing from the spirit of the invention which is not limited as to those matters or otherwise than as the prior art and the appended claims may require.

I claim:

1. A dental amalgam machine comprising in combination measuring mechanism, mixing mechanism, a power device, connections for driving said measuring and mixing mechanisms by the power device, and settable stop motion mechanism for the measuring and mixing mechanisms.

2. A dental amalgam machine comprising in combination measuring mechanism, mixing mechanism a power device having connections for driving said measuring and mixing mechanisms, settable stop motion mechanisms for stopping the measuring mechanism in advance of the mixing mechanism, and dial provisions for manually setting the stop motion mechanisms.

3. A dental amalgam machine comprising in combination measuring mechanism, mixing mechanism, a power device having a manually operable starting controller and a settable stop motion controller mechanism operated by the power device, driving mechanism interposed between the power device and the mixing and the measuring mechanisms and including a settable stop motion mechanism for the measuring mechanism, and manually operable dial provisions for pre-setting each of said stop motion mechanisms.

4. A dental amalgam machine comprising in combination measuring mechanism, mixing mechanism, a power device having a controller operable manually to start the power device, driving connections permanently interposed between the power device and the mixing mechanism, driving devices interposed between said driving connections and the measuring mechanism, stop motion mechanism for the measuring mechanism which stop motion mechanism is driven by said driving connections, controller stop motion mechanism driven from the power device, a dial, and provisions actuated by the dial for respectively and independently presetting the operation of each of said stop motion mechanisms and for connecting the driving devices and the driving connections to start the measuring mechanism.

5. A dental amalgam machine comprising in combination a pestle and mortar, toothed gearing including an upright shaft for rotating the mortar, an eccentric and slot-and-pin mechanism actuated by said shaft for moving the pestle in a circular path, a motor for starting and driving and stopping said shaft, a pivotal plate for feeding material to the mortar, clutch mechanism between said shaft and plate, rotary stop motion mechanism driven from said shaft and adapted to stop the motor, a spring-pressed and pawl released actuator for timing the stop motion mechanism, shipper provisions for the clutch mechanism which include a cam turnable to engage the clutch and to time its release, pawl and ratchet connections for driving the cam in one direction, and manually turnable mechanism connected with the cam for positioning its low part and including a spiral groove and a lever for setting the actuator against the force of its spring and in respect to its pawls.

6. A dental amalgam machine comprising in combination a pestle and mortar, toothed gearing including an upright shaft for rotating the mortar, an eccentric and slot-and-pin mechanism actuated by said shaft for moving the pestle in a circular path, a motor for starting and driving and stopping said shaft a pivotal plate for feeding material to the mortar, clutch mechanism between said shaft and plate, rotary stop motion mechanism driven from said shaft and adapted to stop the motor, a spring-pressed and pawl released actuator for timing the stop motion mechanism, shipper provisions for the clutch mechanism which include a cam turnable to engage the clutch and to time its release, pawl and ratchet connections for driving the cam in one direction, manually turnable mechanism connected with the cam for positioning its low part and including a spiral groove and a lever for setting the actuator against the force of its spring and in respect to its pawls, and detent provisions actuated by the manually turnable mechanism for holding the last named pawl out of action when the machine is at rest.

7. In a dental amalgam machine the combination of mixing mechanism, measuring mechanism including a pivotal plate provided with two feed openings and with a slide for varying the effective area of one of the feed openings, a bar for causing endwise reciprocating motion of the slide, and manual means for positioning the bar to adjust the range of movement of the slide.

ALFRED G. WRIGHT.